May 15, 1928.
F. W. MANNING
1,669,718
MAGAZINE FILTER
Filed Oct. 24, 1925
2 Sheets-Sheet 1
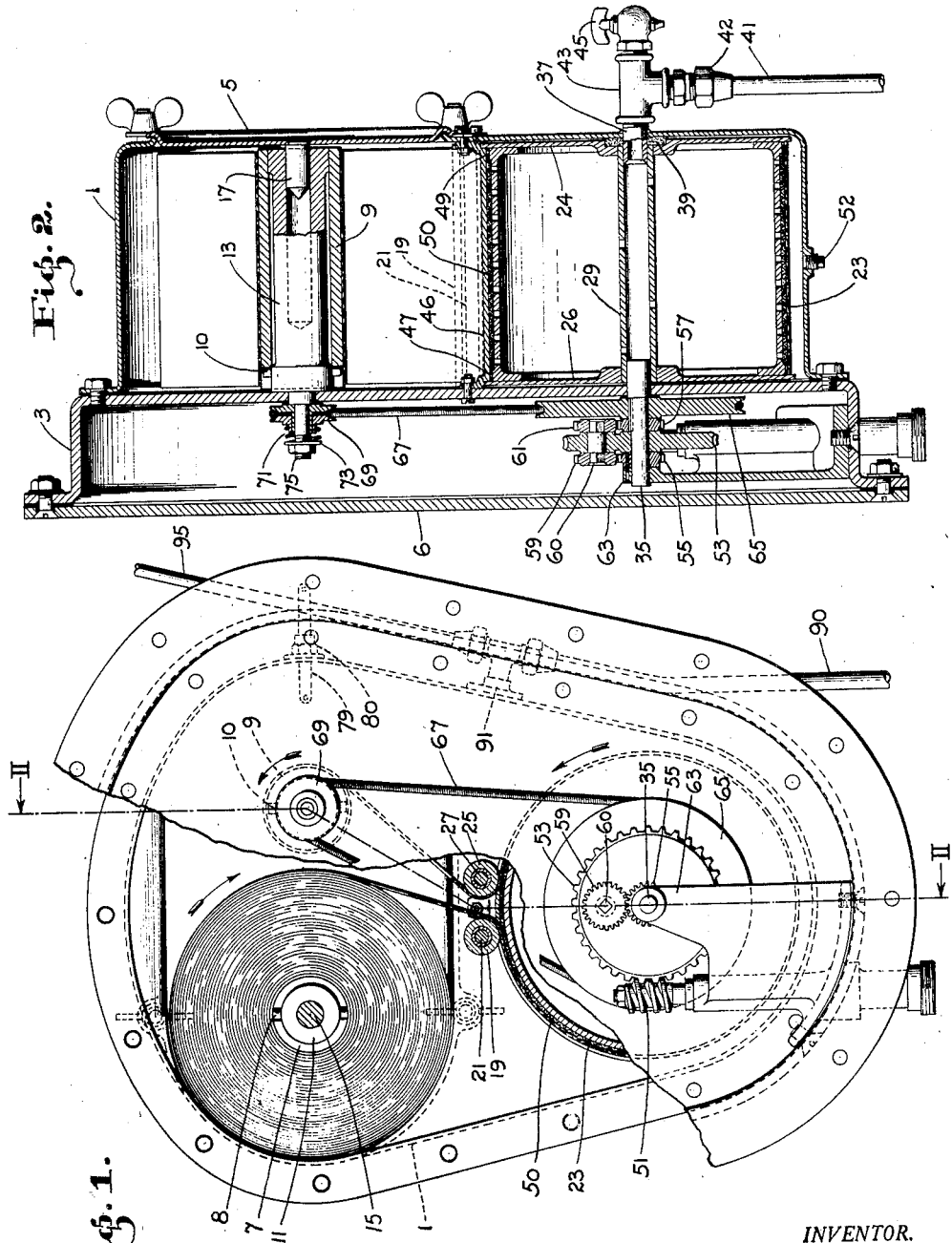
INVENTOR.
Fred W. Manning.
BY
Dewey, Strong, Townsend & Loftus
ATTORNEYS.

May 15, 1928. 1,669,718

F. W. MANNING

MAGAZINE FILTER

Filed Oct. 24, 1925  2 Sheets-Sheet 2

INVENTOR.
Fred W. Manning.
BY
Drury, Strong, Townsend & Loftus
ATTORNEYS.

Patented May 15, 1928.

1,669,718

UNITED STATES PATENT OFFICE.

FRED W. MANNING, OF BERKELEY, CALIFORNIA, ASSIGNOR TO STEWART-WARNER SPEEDOMETER CORPORATION, OF CHICAGO, ILLINOIS, A CORPORATION OF VIRGINIA.

MAGAZINE FILTER.

Application filed October 24, 1925. Serial No. 64,495.

This invention relates to the treatment of liquids for effecting their purification or other desired improvements in their characteristics, but more particularly it relates to the purifying of used motor oils by clarification, decolorization, or other treatment.

Motor oils of moving vehicles very quickly become contaminated with road dust, metal and carbon particles, and other impurities which are often held loosely together by oxidized oil. These impurities not only cause wear to the moving parts of the engine but tend to clog the oil holes, and the abrasive action of these impurities is often accentuated by dilution of the lubricating oil caused by the addition of fuel oil and water by-products of operating with relatively cold engines. The constant wear on the engine parts due to the contamination of crank case oil of motor vehicles has been relieved to some extent by the use of various types of pressure filters. However, these have not been found to be very satisfactory, as their filtering fabrics gradually become clogged with impurities, resulting in decreased filtering rates and increased filtering pressures. The ultimate result is usually the replacement of the filter at considerable expense.

In two previous applications filed October 1, 1925, and October 22, 1925, Serial Numbers 59,787 and 64,247, respectively, I have described how the above mentioned objections may be obviated by means of a magazine type of filter in which the filtering fabric in the form of a belt is fed as required from a supply spool and carried forward during the filtering operation onto a storage spool by means of an endless drainage member supported by rollers and driven as defined in application #64,247 by a small motor attached to the filter base plate. In the present application I describe a somewhat different type of magazine filter in which the filtering fabric during the filtering operation is passed over and carried by a rotating filtrate receiving drum rotated by means of reduction gearing driven by a flexible shaft connected to any suitable moving part of the engine, such as the speedometer drive gear in the transmission case.

In accordance with the present invention the oil to be filtered may be pumped to the filter from any suitable source of supply such as the crank case or other reservoir for receiving the lubricant escaping from the lubricated parts of the engine or other machinery. The filtered oil may be led to the rocker arm bearings and from there distributed, or to any other suitable part of the engine for distribution. A relief or by-pass valve may be inserted between the filter's supply and discharge lines if desirable, but this will seldom be necessary as the rate of filtration is constant due to fresh fabric being continuously or intermittently supplied for filtering purposes as the contaminated filtering fabric is removed and wound on a storage spool. When the oil is cold, as when starting up the engine, such a valve may be of service but probably not at any other time.

Further, in accordance with the present invention, the filtering fabric or belt may be a closely woven metallic cloth, or it may be composed of cotton, paper, asbestos or other fibrous material strengthened by a metallic cloth or a screen incorporated in it, and this fibrous material may be made up in laminated sheets and impregnated with a treating agent as bone char, kieselguhr, etc.

The features of the invention, hereinbefore referred to in general terms, will be better understood by reference to the following description, taken in conjunction with the accompanying drawings which illustrate a preferred form of apparatus for carrying out my invention. It will be understood, however, that the construction herein illustrated and described is merely illustrative of how the features of the invention may be employed, and that the drawings are not to be construed as defining or limiting the scope of the invention, the claims appended to this specification being relied upon for that purpose.

In the drawings:

Figure 1 is a rear elevation of the filter partially in section.

Fig. 2 is a sectional elevation of the filter on lines II—II of Fig. 1.

Figure 4:
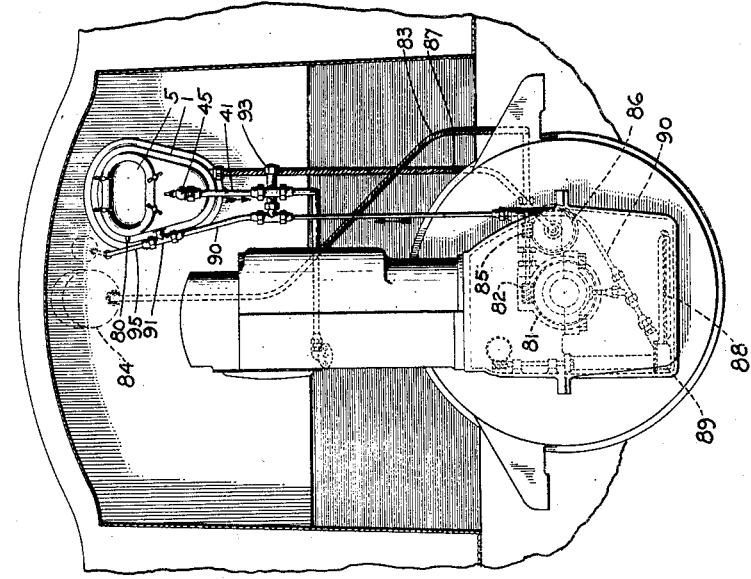
Fig. 4 is a front elevation of the dash of a motor vehicle showing relative position of filter apparatus with piping and shafting connections.

The apparatus as shown in Figs. 1 and 2 consists of sides and front 1 and forming with reduction gear box 3 and door plate 5 a closed filter chamber. Reduction gear box 3 with back cover plate 6 also forms a closed chamber. Spools 7 and 9 slip freely onto spool pins 11 and 13 respectively which rotate freely in the front plate of the reduction gear box 3, their other ends being supported by center pins 15 and 17 respectively which are fastened regidly in the filter chamber door plate 5.

The filter belt from supply spool 7 passes under guide roller 19 held in place by bolt 21, over and around perforated drum 23 under guide roller 25 held in place by bolt 27 and onto the storage spool 9. The perforated drum with end plates 24 and 26 is mounted on a perforated hollow shaft 29 to one end of which is welded driving shaft 35, the other end rotating freely on filtrate outlet pipe 37, which is fastened rigidly to casing front 1. Surrounding filtrate outlet pipe 37 and between the drum end plate 24 and casing front 1 is a felt washer 39 to filter any oil that might pass the rotating surface into the filtrate outlet. Filtrate testing cock 45 and fittings 42 and 43 are connected to the filtrate outlet 37. Unfiltered oil is prevented from passing into the filtrate drum between the ends of the belt by means of closure piece 46 extending the full width of the filter chamber, and under the ends of and fastened to this closure piece, are strips of soft packing 47 and 49 which bear against the smooth narrow peripheral portions of each end of the drum, and between these narrow strips lie the drainage screen or plate 50 and over these strips and the drainage plate and between the drum end plates pass the filtering fabric bearing against both edges of the closure piece 46. Plug 52 may be used for cleaning out or draining purposes.

Reduction gear box 3 and its cover plate 6 contain the reduction gearing for driving the filter drum which pulls the filtering belt. This comprises worm 51, worm gear 53, sun gears 55 and 57 and planet gears 59 and 61. Worm gear 53 rotates freely on shaft 35 but sun gear 57 is keyed to it and sun gear 55 is fastened rigidly to bearing bracket 63. Planet gears 59 and 61 are both keyed to a shaft 60 which passes through and turns freely on the worm gear. Planet gears 59 and 61 are of the same diametrical and circular pitch. Sun gears 55 and 57 are of the same diametrical pitch but very slightly in their circular pitch in that one gear has one tooth more or one less than the other, depending upon the direction of rotation desired. This arrangement of reduction gearing gives a high speed ratio, is economical and compact and is found to be satisfactory where little power is to be transmitted as in the present case.

Reduction gear box 3 also contains pulley 65, spring coil belt 67, split pulley 69, tension spring 71, washer 73 and nut 75 for winding the storage spool 9 by means of side lugs 10 in the pin 13 and preventing any slack in the filtering belt between guide pulley 25 and spool 9 which arrangement allows for belt slippage as the storage spool builds up. No stuffing boxes are shown between the filter and reduction gear chambers as it is desirable that the latter should remain filled with oil passing into it from the filter chamber.

Figure 3:
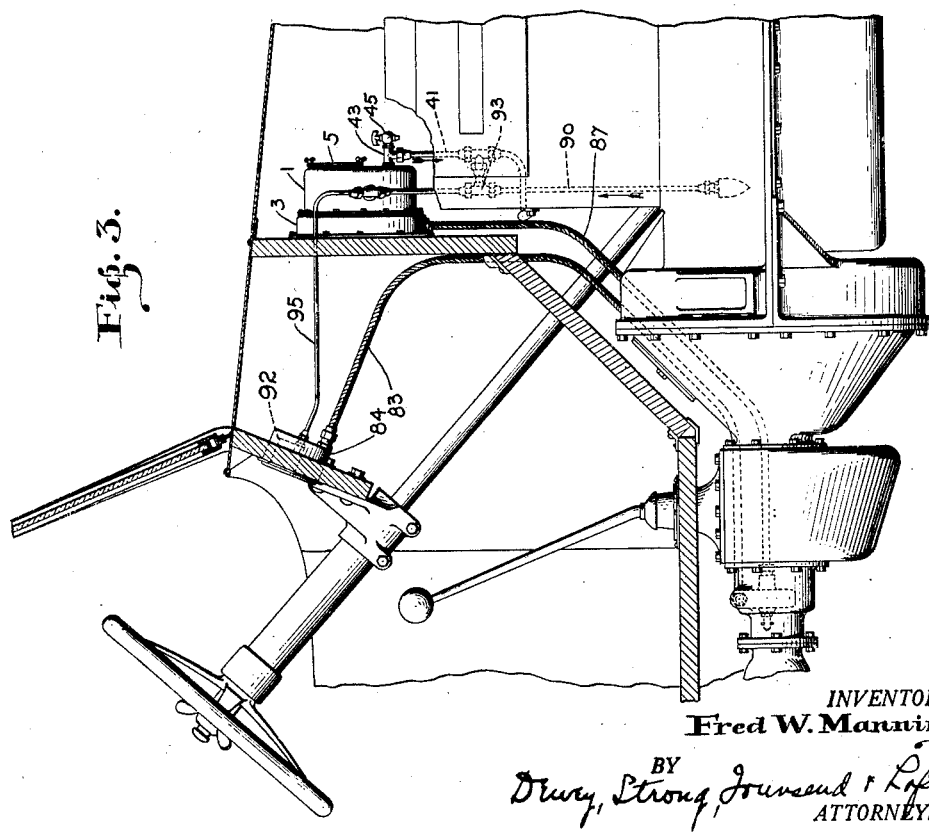
Fig. 3 is a sectional elevation of a motor vehicle showing relative position of filter apparatus with piping and shafting connections.

Figures 3 and 4 show how the apparatus may be attached to the dash of a motor car and also how it may be operated from the transmission box and how the piping connections may be run. As shown the spiral gears 81 and 82 in the transmission casing drive the flexible shafting 83 the end of which may be attached to the speedometer 84. Worm gear 85 on the flexible shafting 83 may drive worm gear 86 connected by flexible shafting 87 to worm 51 in the reduction gear box.

The operation of the apparatus thus constructed has been in part indicated in connection with the foregoing description. Oil from the sump in the crank case reservoir enters the screen inlet 88 of the pump 89 a portion of it going to the crank shaft bearings or other suitable parts of the engine and a portion of it passing up pipe 90 enters the filter at 91 and after passing through the filtering belt into the drum leaves the filter through filtrate outlet 37 and passing through pipe 41 is carried to the rocker arm bearings or other suitable part of the engine for distribution. Pipe 95 is a continuation of pipe 90 past inlet 91 to connect with the oil gauge 92. A relief or by-pass valve 93 may connect the filter feed pipe 90 to the filtrate discharge pipe 41 so that when the engine is first started, a portion of the oil may be by-passed until it warms up and obtains its regular rate of flow through the filtering belt.

Measuring rod 79, which moves outwardly as the storage spool builds up, will indicate clearly when the supply spool has become exhausted and the filter should be replenished with a fresh supply of filtering fabric. The supply spool upon becoming exhausted still retains one end of the belt which is fastened to it by means of hooks or other suitable device not shown and upon exhaustion of the belt the oil in the filter chamber will begin to pass through openings or small holes in the end of the belt into the filtrate drum and from there out. These holes will be provided at the inner ends of the belts on all supply spools purchased and will be for the purpose of allowing the oil to pass through the filter freely without being filtered the moment the supply spool is exhausted and thus relieve the strain on the apparatus which would arise if the oil were allowed to filter through the belt with the filter drum rotating and the end of the filtering belt attached to the exhausted supply spool. Coil spring 67 will place but little tension on the filter belt—only sufficient to take up the slack between guide roller 25 and storage spool 9.

Having thus described my invention, what I claim is:

1. A magazine filter comprising a casing; a movable filter wall member within the casing having an interior chamber, a continuous filter member, a pair of spools for supporting said filter member with an intermediate portion thereof carried on the filter wall member, means providing an oil inlet into the casing outside the filter wall member, and an oil outlet from the casing leading from the chamber of said filter wall member; means for moving the filter wall slowly in a manner for moving the filter member therewith; driving means for one of the spools for winding the filter member thereon from the other spool as it passes from said other spool to and over the filter wall member, said driving means being adapted to drive the spool yieldingly, whereby it may yield to compensate for the increased diameter of the coil of the filtering member wound thereon.

2. A magazine filter comprising a casing; a filtering drum member thereon, a pair of spools; a continuous filter member supported by the spools with an intermediate portion thereof carried about the filtering drum; means providing an oil inlet into the casing outside the filtering drum, and an oil outlet from the casing from within said drum; means for rotating the drum slowly in a manner for moving the continuous filter member therewith, and means for driving one of the spools to wind the used filter member thereon as it passes from the drum, said driving means being adapted to drive the spool yieldingly to compensate for the increasing diameter of the coil of the filtering member wound thereon as the winding continues.

3. A magazine filter comprising a casing; a movable filter wall member within the casing having an interior chamber, a continuous filter member, a pair of spools for supporting said filter member with an intermediate portion thereof carried on the filter wall member, means providing an oil inlet into the casing outside the filter wall member, and an oil outlet from the casing leading from the chamber of said filter wall member; driving connections from the engine for moving the filter wall slowly in a manner for moving the filter member therewith; connections from said engine driving connections for rotating one of the spools for winding the filter member thereon from the other spool as it passes from said other spool to and over the filter wall member, said last mentioned driving connections being adapted to drive the spool yieldingly, whereby it may yield to compensate for the increased diameter of the coil of the filtering member wound thereon.

FRED W. MANNING.